(12) United States Patent
Chen et al.

(10) Patent No.: US 9,088,604 B1
(45) Date of Patent: Jul. 21, 2015

(54) SYSTEMS AND METHODS FOR TREATING LOCALLY CREATED FILES AS TRUSTWORTHY

(75) Inventors: Joseph Chen, Los Angeles, CA (US); Jeffrey Wilhelm, Venice, CA (US)

(73) Assignee: Symantec Corporation, Mountain View, CA (US)

( * ) Notice: Subject to any disclaimer, the term of this patent is extended or adjusted under 35 U.S.C. 154(b) by 330 days.

(21) Appl. No.: 13/517,537

(22) Filed: Jun. 13, 2012

(51) Int. Cl.
*H04L 29/06* (2006.01)
*G06F 21/56* (2013.01)

(52) U.S. Cl.
CPC .......... *H04L 63/1433* (2013.01); *G06F 21/566* (2013.01); *H04L 63/12* (2013.01); *H04L 63/1441* (2013.01)

(58) Field of Classification Search
CPC . H04L 63/1433; H04L 63/1441; H04L 63/12; G06F 21/566
USPC .......................... 726/22, 24, 26; 713/165, 176
See application file for complete search history.

(56) References Cited

U.S. PATENT DOCUMENTS

| | | | | |
|---|---|---|---|---|
| 7,457,951 | B1 * | 11/2008 | Proudler et al. | 713/164 |
| 8,214,904 | B1 * | 7/2012 | Doukhvalov et al. | 726/24 |
| 8,499,150 | B1 * | 7/2013 | Nachenberg | 713/158 |
| 8,726,407 | B2 * | 5/2014 | Etchegoyen | 726/34 |
| 2004/0015724 | A1 * | 1/2004 | Pham et al. | 713/201 |
| 2011/0225655 | A1 * | 9/2011 | Niemela et al. | 726/24 |

* cited by examiner

*Primary Examiner* — Mohammad A Siddiqi
(74) *Attorney, Agent, or Firm* — ALG Intellectual Property, LLC (57) ABSTRACT

A computer-implemented method for treating locally created files as trustworthy may include identifying at least one file created on a computing system protected by a security system that determines whether files encountered by the computing system are trustworthy. The method may also include identifying a software application used to create the file on the computing system. The method may further include determining that the software application used to create the file on the computing system comprises a reputable software application used to create trustworthy files within a user community comprising users of computing systems protected by the security system. In addition, the method may include establishing a trustworthiness exception that causes the security system to treat the file as trustworthy on the computing system that created the file. Various other methods, systems, and computer-readable media are also disclosed.

20 Claims, 6 Drawing Sheets

SYSTEMS AND METHODS FOR TREATING LOCALLY CREATED FILES AS TRUSTWORTHY

BACKGROUND

In today's world of vast computing technology, many technology users are concerned with protecting their computing systems against malware. In an effort to provide such protection, some users may implement a security system configured to1 monitor the trustworthiness of files encountered by their computing systems. Unfortunately, while existing security systems may monitor the trustworthiness of files encountered by users' computing systems, such security systems may occasionally misdiagnose the trustworthiness of certain files created locally on the users' computing systems.

For example, a software developer may configure a security system to monitor the trustworthiness of files encountered by her computing system. The software developer may later create an executable file on her computing system. After the software developer has created this executable file, the security system may perform a scan of the files on the developer's computing system. During this scan, the security system may mistakenly determine that the locally created executable file includes malware. Unfortunately, this false positive generated by the security system may have a negative impact on the software developer's experience with the security system.

What is needed, therefore, is a mechanism that mitigates false positives associated with locally created files by causing security systems to treat certain files as trustworthy on the computing systems that created the files.

SUMMARY

As will be described in greater detail below, the instant disclosure generally relates to systems and methods for treating locally created files as trustworthy to mitigate false positives associated with the locally created files. In one example, a computer-implemented method for treating locally created files as trustworthy may include (1) identifying at least one file created on a computing system protected by a security system that determines whether files encountered by the computing system are trustworthy, (2) identifying a software application used to create the file on the computing system, (3) determining that the software application used to create the file on the computing system comprises a reputable software application used to create trustworthy files within a user community comprising users of computing systems protected by the security system, and then (4) establishing, in response to the determination, a trustworthiness exception that causes the security system to treat the file as trustworthy on the computing system that created the file.

Examples of the security system include, without limitation, a reputation-based security system that uses reputation information gathered from the user community to determine whether files encountered within the user community are trustworthy, a heuristic-based security system that uses at least one heuristic to determine whether files encountered by the computing system are trustworthy, any combination of one or more of the same, and/or any other suitable security system.

In some examples, the method may also include preventing the security system from mistakenly determining that the file comprises malware due to insufficient reputation information associated with the file within the user community. Additionally or alternatively, the method may include preventing the security system from mistakenly determining that the file comprises malware based on the security system's use of a heuristic on the file.

In some examples, the method may also include analyzing reputation information gathered from the user community. In such examples, the method may further include determining that the users within the user community have used the software application to create trustworthy files based at least in part on the analysis of the reputation information. In addition, the method may include determining that the software application comprises a reputable software application based at least in part on the determination that the users within the user community have used the software application to create trustworthy files.

In some examples, the method may also include determining that the security system has classified the file as untrustworthy. In such examples, the method may further include applying the trustworthiness exception to the file such that the security system treats the file as trustworthy on the computing system that created the file despite the file's classification as untrustworthy.

In some examples, the method may also include identifying a list of reputable software applications used to create trustworthy files within the user community. In such examples, the method may further include comparing the software application used to create the file on the computing system with the list of reputable software applications. In addition, the method may include determining, based at least in part on the comparison, that the software application used to create the file on the computing system matches at least one of the reputable software applications identified in the list.

In some examples, the method may also include identifying the file on at least one additional computing system within the user community. In such examples, the method may further include classifying the file as untrustworthy on the additional computing system and then treating the file as untrustworthy on the additional computing system despite the file's trustworthiness exception on the computing system. In addition, the method may include maintaining the file's trustworthiness exception on the computing system such that the security system continues to treat the file as trustworthy on the computing system despite the security system's treatment of the file as being untrustworthy on the additional computing system.

In some examples, the method may also include identifying a software developer registered with the user community associated with the security system. In such examples, the method may include determining that the registered software developer directed the software application to create the file on the computing device. In addition, the method may include determining that the software application used to create the file comprises a reputable software application based at least in part on the determination that the registered software developer directed the software application to create the file.

In one embodiment, a system for implementing the above-described method may include (1) an identification module programmed to (a) identify at least one file created on a computing system protected by a security system that determines whether files encountered by the computing system are trustworthy and (b) identify a software application used to create the file on the computing system and (2) a trustworthiness module programmed to (a) determine that the software application used to create the file on the computing system comprises a reputable software application used to create trustworthy files within a user community comprising users of computing systems protected by the security system and (b) establish, in response to the determination, a trustworthiness exception that causes the security system to treat the file as trustworthy on the computing system that created the file.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify at least one file created on a computing system protected by a security system that determines whether files encountered by the computing system are trustworthy, (2) identify a software application used to create the file on the computing system, (3) determine that the software application used to create the file on the computing system comprises a reputable software application used to create trustworthy files within a user community comprising users of computing systems protected by the security system, and then (4) establish, in response to the determination, a trustworthiness exception that causes the security system to treat the file as trustworthy on the computing system that created the file.

As will be explained in greater detail below, by treating files as trustworthy on the computing systems that created the files, the various systems and methods described herein may mitigate false positives generated by security systems on files created locally on the computing systems. In addition, by mitigating false positives generated by security systems on such locally created files, these systems and methods may help improve user experience for the users of the computing systems protected by the security systems.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
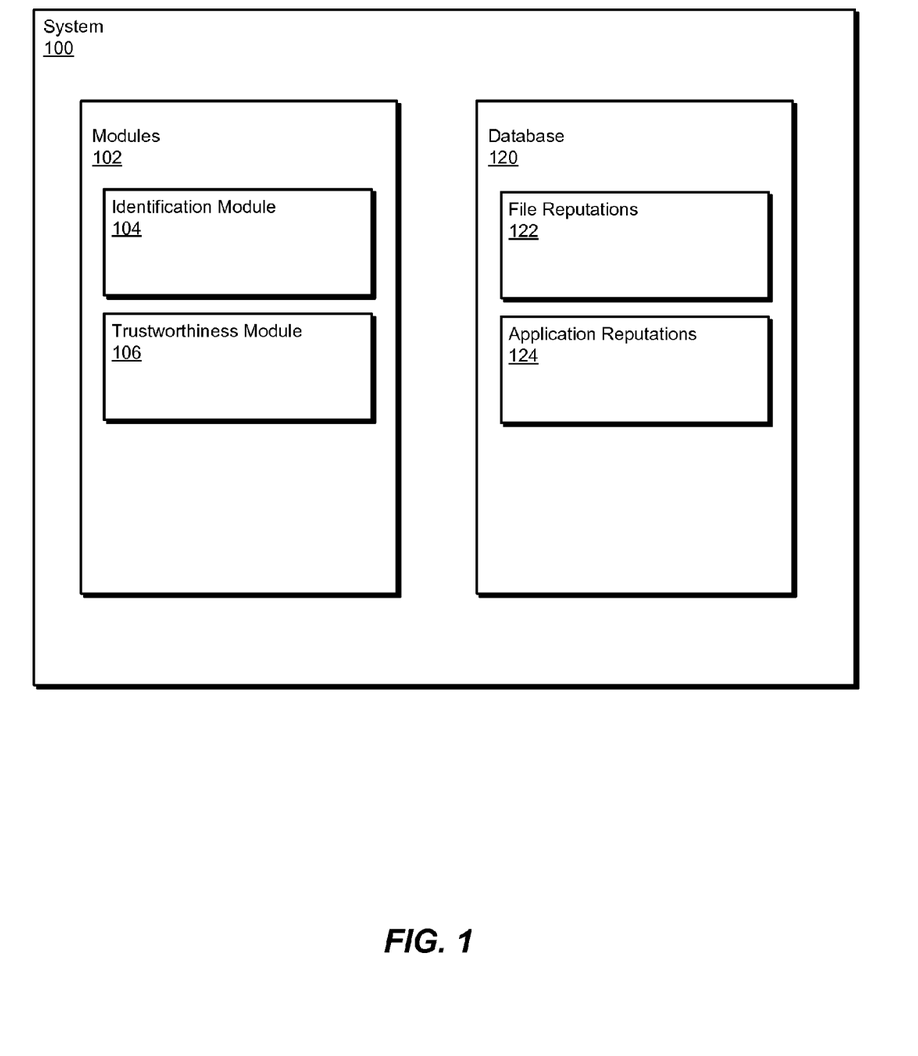
FIG. 1 is a block diagram of an exemplary system for treating locally created files as trustworthy.
Figure 2:
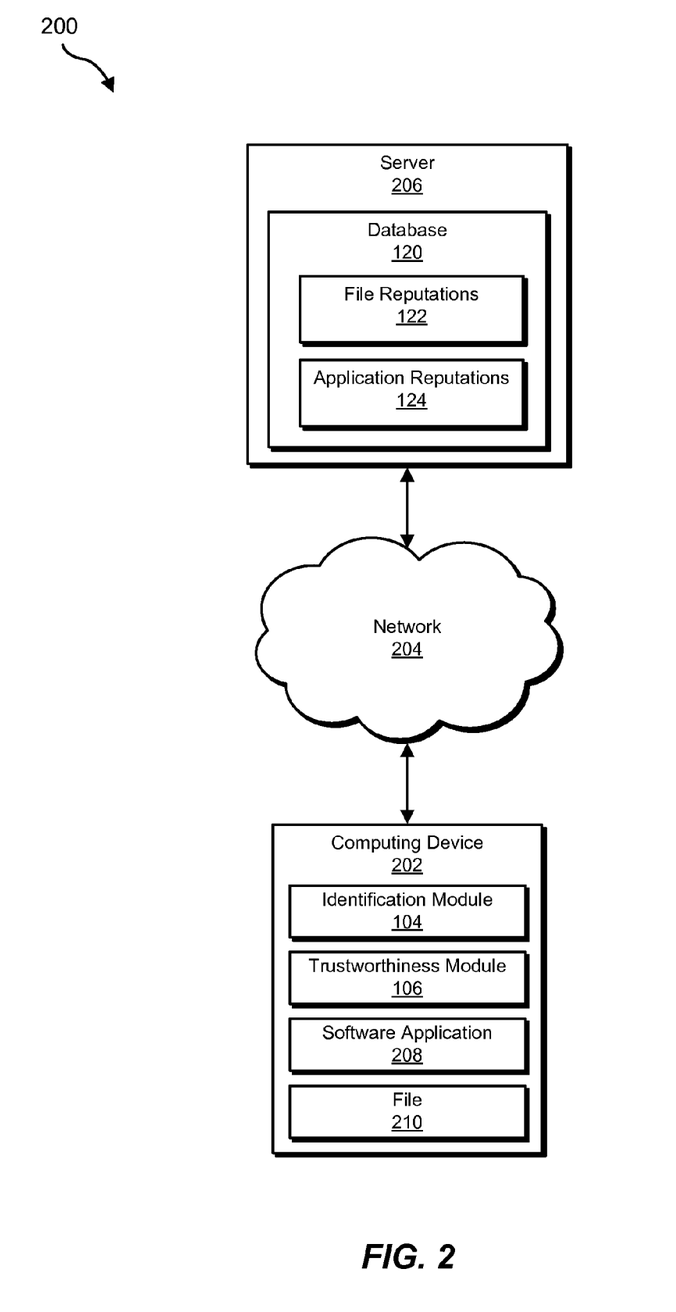
FIG. 2 is a block diagram of an exemplary system for treating locally created files as trustworthy.

The following will provide, with reference to FIGS. 1-2, detailed descriptions of exemplary systems for treating locally created files as trustworthy. Detailed descriptions of corresponding computer-implemented methods will also be provided in connection with FIG. 3, and detailed descriptions of exemplary reputation information and an exemplary list of reputable software applications will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for treating locally created files as trustworthy. As illustrated in this figure, exemplary system 100 may include one or more modules 102 for performing one or more tasks. For example, and as will be explained in greater detail below, exemplary system 100 may include an identification module 104 programmed to (1) identify at least one file created on a computing system protected by a security system that determines whether files encountered by the computing system are trustworthy and (2) identify a software application used to create the file on the computing system.

In addition, and as will be described in greater detail below, exemplary system 100 may include a trustworthiness module 106 programmed to (1) determine that the software application used to create the file on the computing system comprises a reputable software application used to create trustworthy files within a user community comprising users of computing systems protected by the security system and (2) establish, in response to the determination, a trustworthiness exception that causes the security system to treat the file as trustworthy on the computing system that created the file. Although illustrated as separate elements, one or more of modules 102 in FIG. 1 may represent portions of a single module or application (such as a single security-system application (e.g., SYMANTEC'S NORTON INTERNET SECURITY, SYMANTEC'S NORTON ANTIVIRUS, and/or SYMANTEC'S NORTON 360)).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store file reputations 122 used to identify the reputation of files encountered within a user community. Additionally or alternatively, database 120 may be configured to store application reputations 122 used to identify the reputation of software applications that created files encountered within the user community.

Although not illustrated in FIG. 1, database 120 may also include various additional information used to treat files created locally on computing systems as trustworthy.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, enable computing device 202 to treat locally created files as trustworthy. For example, and as will be described in greater detail below, one or more of modules 102 may cause computing device 202 to (1) identify at least one file created on computing device 202 protected by a security system that determines whether files encountered by computing device 202 are trustworthy, (2) identify a software application used to create the file on computing device 202, (3) determine that the software application used to create the file on computing device 202 comprises a reputable software application used to create trustworthy files within a user community comprising users of computing systems protected by the security system, and then (4) establish, in response to the determination, a trustworthiness exception that causes the security system to treat the file as trustworthy on computing device 202 since the file was created on computing device 202.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device capable of providing file reputations and/or application reputations to computing devices used by users within a user community. Examples of server 206 include, without limitation, application servers, web servers, reputation servers, and database servers configured to run certain software applications and/or provide various web, reputation, and/or database services.

Software application 208 generally represents any type or form of application capable of creating files, scripts, and/or code on a computing device. Examples of software application 208 include, without limitation, compilers, assemblers, integrated development environments (such as MICROSOFT VISUAL STUDIO, ECLIPSE, XCODE, ORACLE JDEVELOPER, STANI'S PYTHON EDITOR, NETBEANS, WINDEV, and KIMODO EDIT), software build automators, source code editors, script editors, operating systems, any combination of one or more of the same, and/or any other suitable software application.

File 210 generally represents any type or form of file, script, and/or code capable of being created by a software application installed on a computing device. Examples of file 210 include, without limitation, executable files (such as .EXE files, .APP files, .BAT files, .CGI files, .COM files, .GADGET files, .JAR files, .PIF files, .VB files, .WSF files), scripts (such as PYTHON scripts), binary code, machine code, any combination of one or more of the same, and/or any other suitable file.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
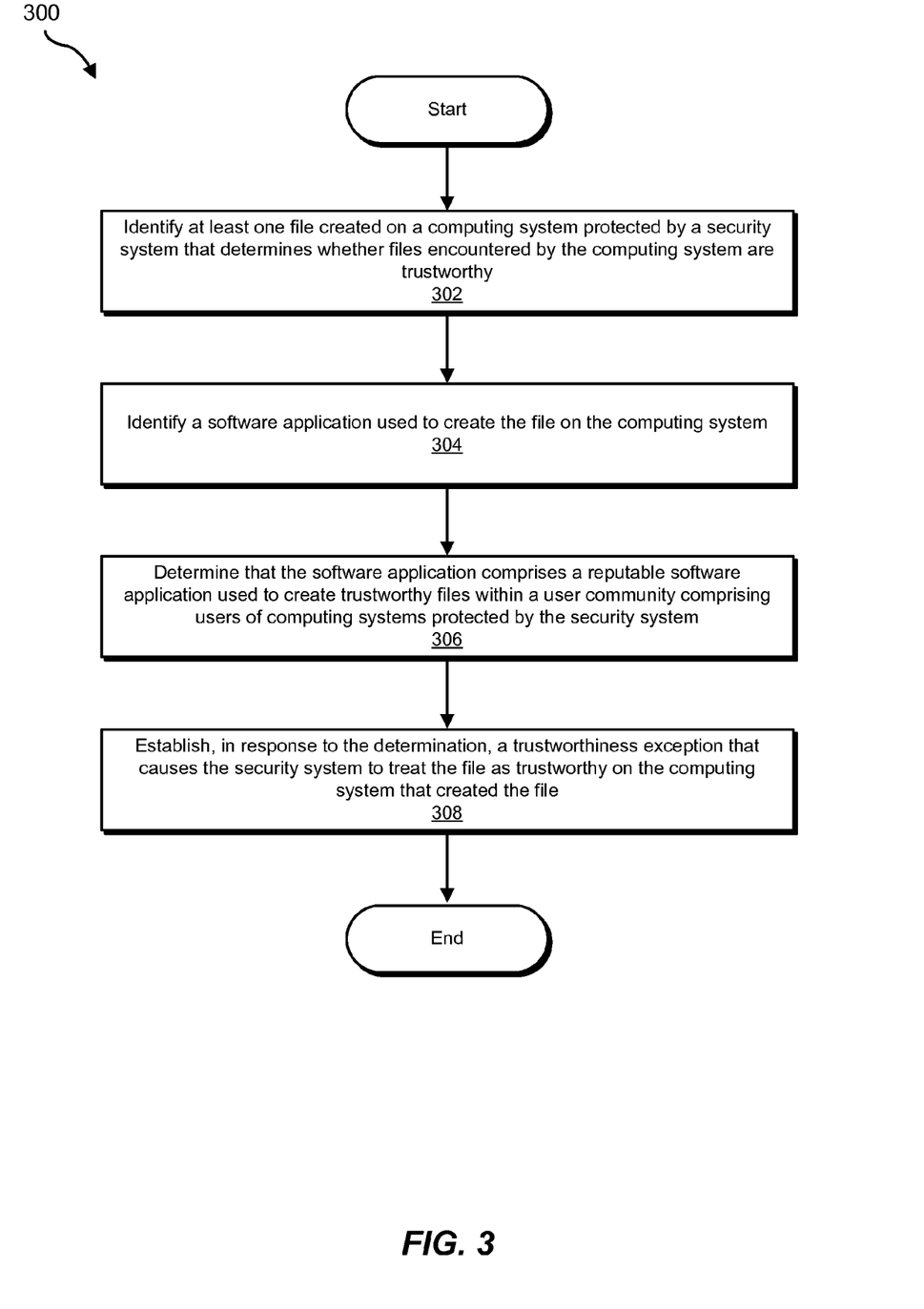
FIG. 3 is a flow diagram of an exemplary method for treating locally created files as trustworthy.

FIG. 3 is a flow diagram of an exemplary computer-implemented method 300 for treating locally created files as trustworthy. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated at step 302 in FIG. 3, one or more of the various systems described herein may identify at least one file created on a computing system protected by a security system that determines whether files encountered by the computing system are trustworthy. For example, identification module 104 may, as part of computing device 202, identify file 210 located on computing device 202. In this example, computing device 202 may have created file 210.

The systems described herein may perform step 302 in a variety of ways. In one example, identification module 104 may identify file 210 as computing device 202 creates file 210. For example, a software developer may direct computing device 202 to create file 210 as part of a work project. In this example, identification module 104 may identify file 210 at the time the software developer directs computing device 202 to create file 210.

In one example, identification module 104 may identify file 210 in response to user input configured to direct computing device 202 to create file 210. For example, after the software developer has finished writing the code associated with the work project, the software developer may enter user input that initiates a compiling process that transforms the code into file 210. In this example, file 210 may represent an executable file capable of being executed by computing device 202.

In another example, identification module 104 may identify file 210 by detecting a process associated with file creation on computing device 202. For example, identification module 104 may monitor the processes being performed by computing device 202. In this example, while monitoring these processes, identification module 104 may determine that computing device 202 is performing a process associated with file creation and then trace this process to the newly created file. Upon tracing this process to the newly created file, identification module 104 may determine that the newly created file is file 210.

In a further example, identification module 104 may identify file 210 by detecting a newly created file within a file system associated with computing device 202. For example, identification module 104 may monitor at least one file system located on or accessible to computing device 202. In this example, while monitoring the file system, identification module 104 may detect a new file created within the file system and then identify the new file as file 210.

In some examples, computing device 202 may include a security system (or at least an agent of a security system) that monitors and/or determines the trustworthiness of files encountered on or by computing device 202. For example, the security system may monitor the trustworthiness of files accessed and/or downloaded by computing device 202 from other computing devices via network 204. In addition, the security system may monitor the trustworthiness of files created locally on computing device 202.

Examples of security systems include, without limitation, a reputation-based security system that uses reputation information gathered from a user community to determine whether files encountered within the user community are trustworthy, a heuristic-based security system that uses at least one heuristic to determine whether files encountered by a computing system are trustworthy, a signature-based security system that uses a set of known malware signatures to determine whether files encountered by a computing system are trustworthy, a cloud-based security system that leverages remote processing resources to determine whether files encountered by a computing device are trustworthy, a distributed security system that includes an agent installed on a computing device that interfaces with a remote backend capable of determining whether files encountered by the computing device are trustworthy, any combination of one or more of the same (e.g., SYMANTEC'S NORTON INTERNET SECURITY, SYMANTEC'S NORTON ANTIVIRUS, and/or SYMANTEC'S NORTON 360), and/or any other suitable security system.

As illustrated at step 304 in FIG. 3, one or more of the various systems described herein may identify a software application used to create the file on the computing system. For example, identification module 104 may, as part of computing device 202, identify software application 208 installed on computing device 202. In this example, identification module 104 may determine that software application 208 was used to create file 210 on computing device 202.

The systems described herein may perform step 304 in a variety of ways. In one example, and as indicated above, identification module 104 may monitor the processes being performed by computing device 202. For example, upon detecting the creation of file 210, identification module 104 may identify the process being performed by computing device 202 at the time file 210 is created. Identification module 104 may then determine that the process being performed at the time of the file's creation represents part of software application 208.

In another example, identification module 104 may analyze one or more attributes of file 210 to determine which software application was used to create the file on computing device 202. For example, identification module 104 may examine metadata associated with file 210. In this example, upon examining the file's metadata, identification module 104 may locate an identifier that identifies the software application used to create the file. Identification module 104 may then determine, based on at least in part on this identifier, that software application 208 was used to create file 210 on computing device 202.

As illustrated at step 306 in FIG. 3, one or more of the various systems described herein may determine that the software application used to create the file on the computing system comprises a reputable software application. For example, trustworthiness module 106 may, as part of computing device 202 (or, alternatively, server 206), determine that software application 208 comprises a reputable software application used to create trustworthy files within a user community. In this example, the user community may include users of computing systems protected by the same security system (sometimes referred to as the security-system vendor's user base).

The systems described herein may perform step 306 in a variety of ways. In one example, trustworthiness module 106 may use reputation information provided by the security system to determine that software application 208 comprises a reputable software application. The term "reputation information," as used herein, generally refers to any type or form of information capable of being used to identify and/or determine the reputation of software applications and/or files created by the software applications on user devices within a user community.

Examples of reputation information include, without limitation, reputation scores (where, e.g., high reputation scores indicate that a particular software application or file is generally trusted within the user community and low reputation scores indicate that a particular software application or file is generally untrusted within the user community), prevalence information (e.g., information that identifies the number or percentage of user devices within the user community that include a particular software application or file), vendor information (e.g., information that identifies a software vendor that produced a particular software application), age information (e.g., information that identifies the age of a particular software application or file), and/or any other suitable reputation information.

In some examples, the security system may generate reputation information for software applications and files by collecting, aggregating, and analyzing data from user devices within the user community. Examples of such data capable of being used to generate the reputation information include, without limitation, information that identifies the overall health of a user device (e.g., information that identifies the performance, stability, and/or state of security of the user device), information that identifies the files created by a particular software application on a user device, information that identifies the impact of a file created by a particular software application on the health of a user device (e.g., information that identifies the health of a user device both before and after a file is encountered by the user device), and/or any other data capable of being used to evaluate the trustworthiness of a particular software application or file. By collecting, aggregating, and analyzing such data from potentially millions of user devices within a user community, the security system may be able to gain a fairly accurate understanding as to the trustworthiness of a particular software application or file.

In one example, trustworthiness module 106 may obtain reputation information that identifies the reputation of software application 208. For example, trustworthiness module 106 may access application reputations 124 within database 120 on server 206. In this example, trustworthiness module 106 may analyze application reputations 124 and identify a reputation 400 during this analysis.

Figure 4:
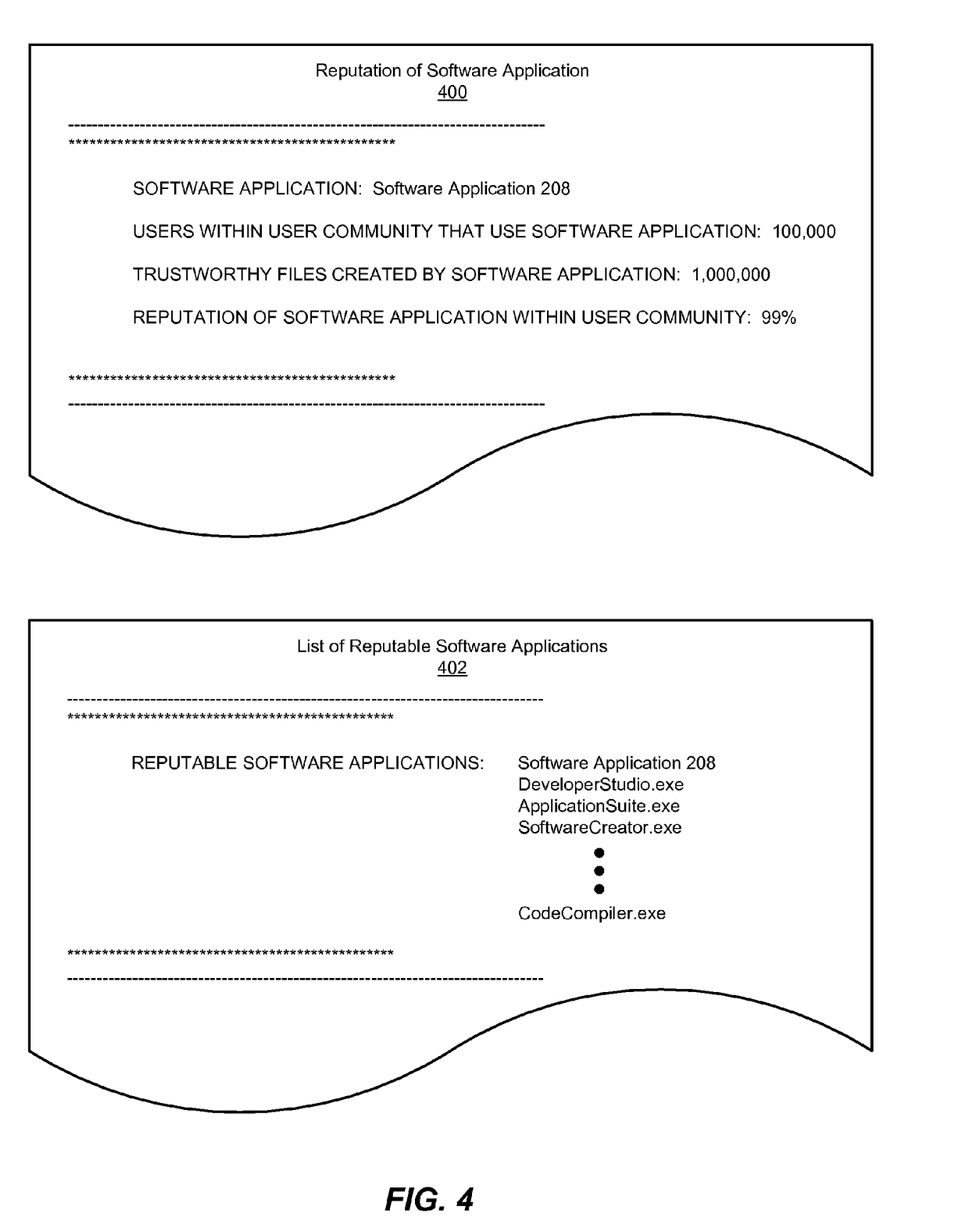
FIG. 4 is an illustration of exemplary reputation information and an exemplary list of reputable software applications.

As illustrated in FIG. 4, reputation 400 may include information that identifies the relevant software application (in this example, "Software Application 208"), the number of users within the user community that use the software application (in this example, "100,000"), the number of trustworthy files created by the software application (in this example, "1,000,000"), and the reputation score of the software application within the user community (in this example, "99%"). Upon identifying reputation 400, trustworthiness module 106 may analyze reputation 400 and determine that software application 208 comprises a reputable software application based at least in part on this analysis.

In some examples, trustworthiness module 106 may obtain a list 402 that identifies reputable software applications used to create trustworthy files within the user community. As illustrated in FIG. 4, list 402 may enumerate various software applications that the security system or an administrator associated with the security system has classified as reputable software applications (in this example, "Software Application 208," "DeveloperStudio.exe," "ApplicationSuite.exe," "SoftwareCreator.exe," and "CodeCompiler.exe"). In one example, trustworthiness module 106 may access list 402 within database 120 on server 206. In another example, trustworthiness module 106 may retrieve list 402 from a local storage device on computing device 202.

In one example, trustworthiness module 106 may compare software application 208 with list 402. For example, trustworthiness module 106 may search for software application 208 in list 402. In this example, while performing the search, trustworthiness module 106 may identify software application 208 in list 402. Trustworthiness module 106 may then determine that software application 208 comprises a reputable software application since software application 208 is included in list 402.

In one example, trustworthiness module 106 may identify the software developer that directed software application 208 to create file 210 on computing device 202. In this example, trustworthiness module 106 may determine that the software developer is registered with the user community. Trustworthiness module 106 may then determine that software application 208 comprises a reputable software application since the registered software developer directed software application 208 to create file 210 on computing device 202.

As illustrated at step 308 in FIG. 3, one or more of the various systems described herein may establish a trustworthiness exception that causes the security system to treat the file as trustworthy on the computing system that created the file. For example, trustworthiness module 106 may, as part of computing device 202 (or, alternatively, server 206), establish a trustworthiness exception that causes the security system to treat file 210 as trustworthy on computing device 202. In this example, trustworthiness module 106 may establish the trustworthiness exception in response to the determination that software application 208 was used to create file 210 on computing device 202.

The systems described herein may perform step 308 in a variety of ways. In some examples, trustworthiness module 106 may determine that the security system has classified the file as untrustworthy. In one example, the security system may have access to very little information regarding file 210 since computing device 202 recently created file 210 and has yet to distribute file 210 to any other user devices within the user community. In this example, upon detecting the creation of file 210, the security system may perform a reputation analysis on file 210 to determine the trustworthiness of file 210.

In one example, the reputation analysis performed on file 210 may indicate that file 210 has a poor reputation within the user community. In this example, the security system may classify file 210 as untrustworthy based at least in part on the reputation analysis. Upon determining that the security system has classified file 210 as untrustworthy, trustworthiness module 106 may apply the trustworthiness exception to file 210 such that the security system treats file 210 as trustworthy on computing device 202 despite the file's classification as untrustworthy. By applying the trustworthiness exception to file 210 on computing device 202, trustworthiness module 106 may mitigate false positives resulting from one or more imperfections associated with the reputation analysis performed by the security system on file 210.

In another example, upon detecting the creation of file 210, the security system may perform a heuristic analysis on file 210 to determine the trustworthiness of file 210. For example, the security system may use at least one heuristic to determine the trustworthiness of file 210. The term "heuristic," as used herein, generally refers to any type or form of tool, model, or set of rules capable of being used to determine the trustworthiness of a file.

In one example, the heuristic analysis performed on file 210 may indicate that file 210 is untrustworthy. In this example, the security system may classify file 210 as untrustworthy based at least in part on the heuristic analysis. Upon determining that the security system has classified file 210 as untrustworthy, trustworthiness module 106 may apply the trustworthiness exception to file 210 such that the security system treats file 210 as trustworthy on computing device 202 despite the file's classification as untrustworthy. By applying the trustworthiness exception to file 210 on computing device 202, trustworthiness module 106 may mitigate false positives resulting from one or more imperfections associated with the heuristic analysis performed by the security system on file 210.

In some examples, the file's trustworthiness exception may prevent the security system from mistakenly determining that file 210 includes malware. In one example, the file's trustworthiness exception may cause the security system to forgo generating any sort of indication that file 210 includes malware. For example, even though the security system has classified file 210 as untrustworthy, the file's trustworthiness exception may prevent the security system from providing a malware alert associated with file 210 for display on computing device 202.

In some examples, the security system may determine that computing device 202 has distributed file 210 to at least one additional user device (not illustrated in FIG. 2) within the user community. For example, the security system may identify an instance of file 210 on the additional user device within the user community. In this example, the security system may classify the instance of file 210 on the additional user device as untrustworthy (based, e.g., on a reputation analysis and/or heuristic analysis performed on the instance of file 210). Since the additional user device did not create file 210, the security system may treat the instance of file 210 on the additional user device as untrustworthy despite the file's trustworthiness exception on computing device 202.

In addition, even after the security system has begun to treat the instance of file 210 on the additional user device as untrustworthy, the security system may maintain the file's trustworthiness exception on computing device 202. In other words, since computing device 202 created file 210, the security system may continue to treat file 210 as trustworthy on computing device 202 despite the security system's treatment of the instance of file 210 as untrustworthy on the additional user device.

In some examples, the security system may override the file's trustworthiness exception on computing device 202. In one example, the security system may treat file 210 as untrustworthy on computing device 202 even though trustworthiness module 106 previously applied the file's trustworthiness exception on computing device 202. For example, after trustworthiness module 106 has applied the trustworthiness exception to file 210 on computing device 202, the security system may perform a deterministic analysis on file 210 in an attempt to verify the trustworthiness of file 210. The phrase "deterministic analysis," as used herein, generally refers to any type or form of malware-detection technique capable of being used to definitively determine that a file is untrustworthy.

In one example, the deterministic analysis performed on file 210 may indicate that file 210 is untrustworthy. In this example, the security system may override the file's trustworthiness exception on computing device 202 since the deterministic analysis indicates that file 210 is untrustworthy. Upon overriding the file's trustworthiness exception, the security system may begin to treat file 210 as untrustworthy on computing device 202 despite the trustworthiness exception previously applied to file 210 on computing device 202.

As explained above, by treating files as trustworthy on the computing systems that created the files, the various systems and methods described herein may mitigate false positives generated by security systems on files created locally on the computing systems. In addition, by mitigating false positives generated by security systems on such locally created files, these systems and methods may help improve user experience for the users of the computing systems protected by the security systems.

Figure 5:
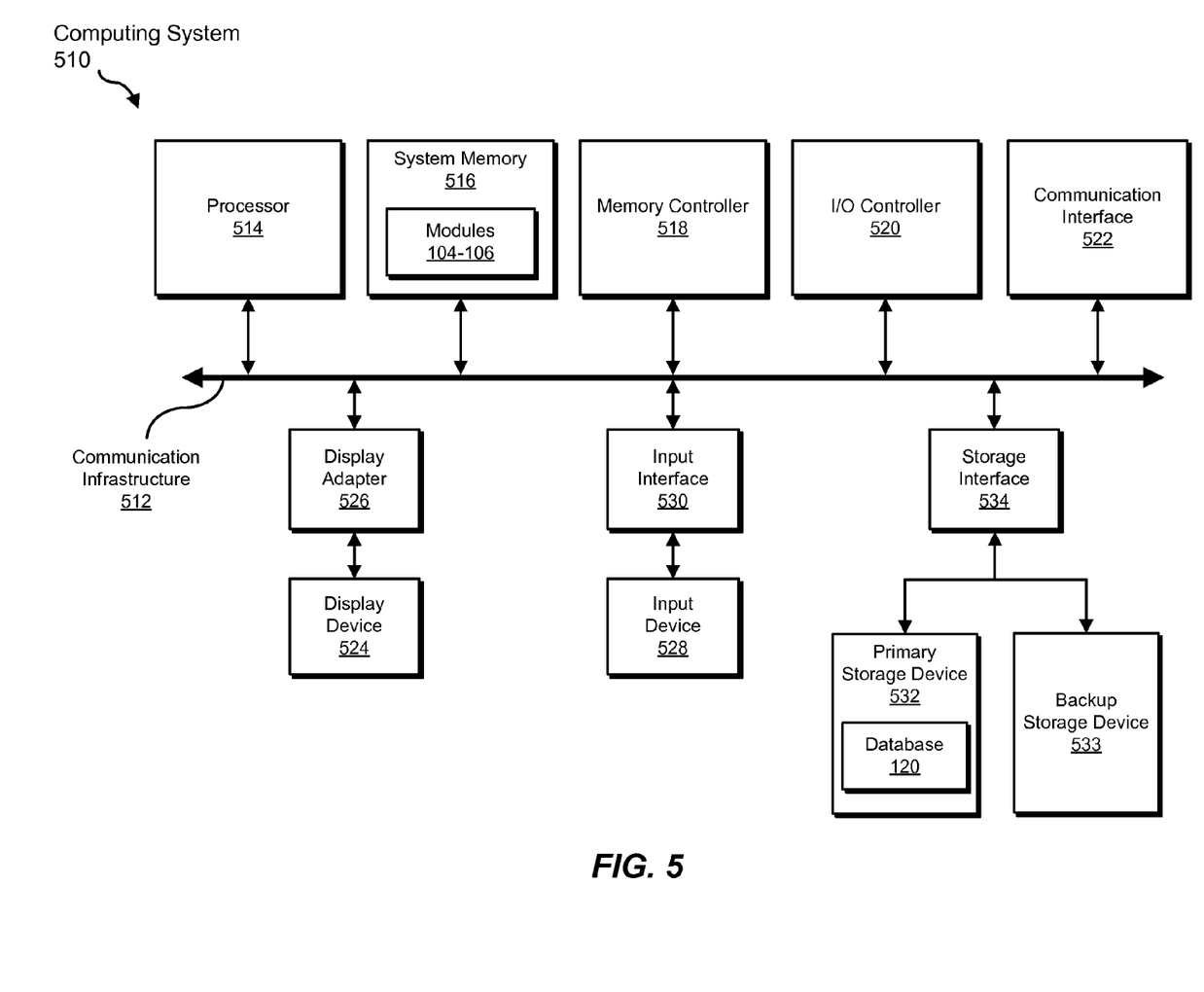
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, establishing, using, preventing, applying, analyzing, comparing, classifying, treating, and maintaining steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
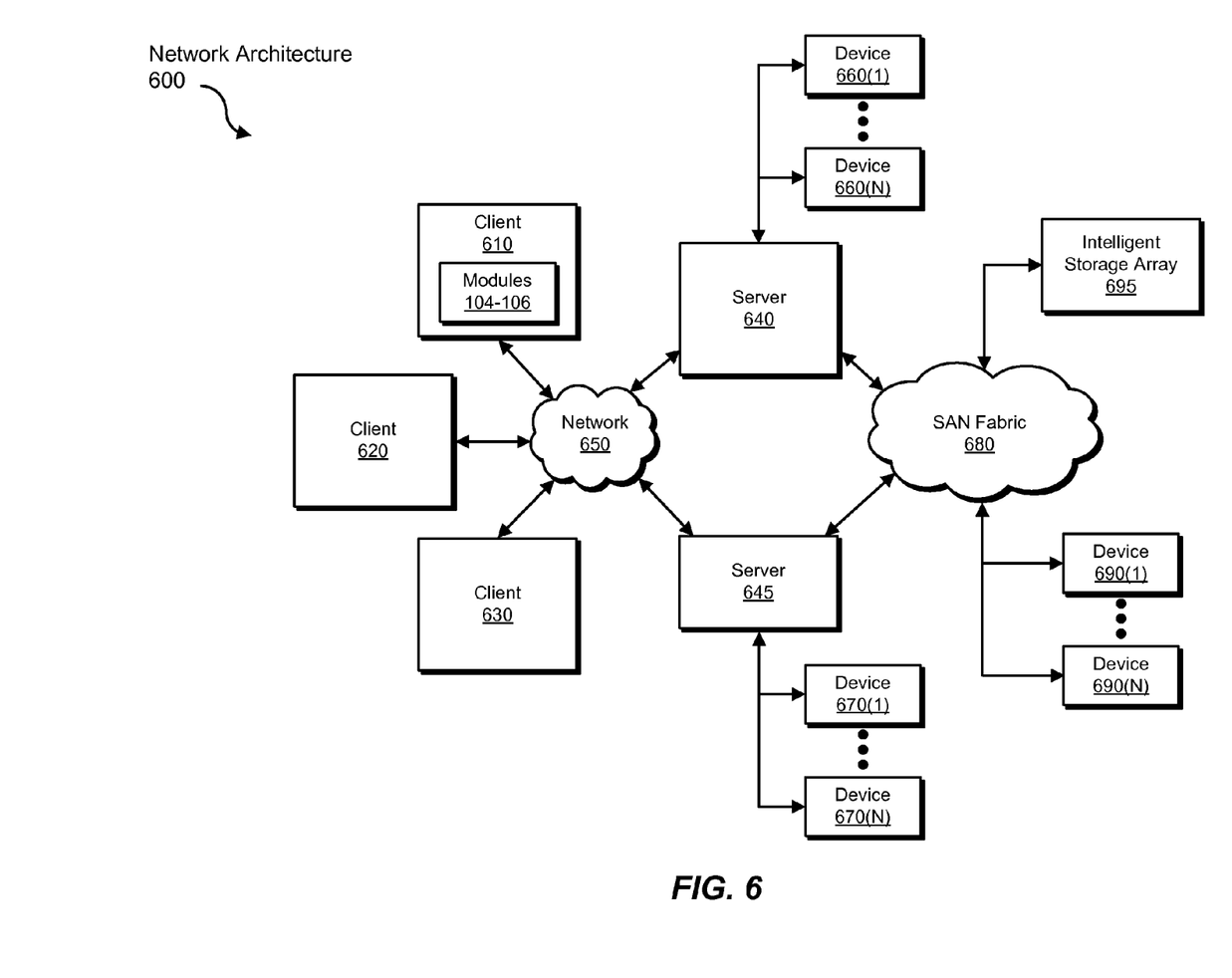
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, establishing, using, preventing, applying, analyzing, comparing, classifying, treating, and maintaining steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for treating locally created files as trustworthy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a characteristic or property of one or more physical devices (such as computing device 202 and/or server 206 in FIG. 2) by causing a security system to treat files as trustworthy on the computing devices that created the files.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for treating locally created files as trustworthy, at least a portion of the method being performed by a computing device comprising at least one processor, the method comprising:
   identifying at least one file created on a computing system protected by a security system that determines whether files encountered by the computing system are trustworthy;
   determining that the security system has classified the file created on the computing system as untrustworthy;
   identifying a software application used to create the file on the computing system;
   determining that the software application used to create the file on the computing system is a reputable software application used to create trustworthy files within a user community comprising users of computing systems protected by the security system;
   in response to determining that the software application used to create the file is a reputable software application, mitigating false positives associated with the file on the computing system where the file was created by establishing a trustworthiness exception that:
     causes the security system to treat the file as trustworthy on the computing system where the file was created even though the security system has classified the file as untrustworthy;
     does not cause the security system to treat the file as trustworthy on an additional computing system protected by the security system due at least in part to the file not having been created on the additional computing system.

2. The method of claim 1, wherein the security system comprises at least one of:
- a reputation-based security system that uses reputation information gathered from the user community to determine whether files encountered within the user community are trustworthy;
- a heuristic-based security system that uses at least one heuristic to determine whether files encountered by the computing system are trustworthy.

3. The method of claim 2, wherein establishing the trustworthiness exception that causes the security system to treat the file as trustworthy comprises preventing the reputation-based security system from mistakenly determining that the file comprises malware due to insufficient reputation information associated with the file within the user community.

4. The method of claim 2, wherein establishing the trustworthiness exception that causes the security system to treat the file as trustworthy comprises preventing the heuristic-based security system from mistakenly determining that the file comprises malware based on the security system's use of the heuristic on the file.

5. The method of claim 2, wherein determining that the software application used to create the file is a reputable software application comprises:
- analyzing the reputation information gathered from the user community;
- determining, based at least in part on the analysis of the reputation information, that the users within the user community have used the software application to create trustworthy files;
- determining, based at least in part on the determination that the users within the user community have used the software application to create trustworthy files, that the software application is reputable.

6. The method of claim 1, wherein establishing the trustworthiness exception that causes the security system to treat the file as trustworthy comprises:
- applying the trustworthiness exception to the file such that the security system treats the file as trustworthy on the computing system where the file was created despite the file's classification as untrustworthy.

7. The method of claim 1, wherein determining that the software application used to create the file is a reputable software application comprises:
- identifying a list of reputable software applications used to create trustworthy files within the user community;
- comparing the software application used to create the file on the computing system with the list of reputable software applications;
- determining, based at least in part on the comparison, that the software application used to create the file on the computing system matches at least one of the reputable software applications identified in the list.

8. The method of claim 1, further comprising:
- identifying the file on at least one additional computing system within the user community;
- classifying the file as untrustworthy on the additional computing system;
- treating the file as untrustworthy on the additional computing system despite the file's trustworthiness exception on the computing system.

9. The method of claim 8, further comprising maintaining the file's trustworthiness exception on the computing system such that the security system continues to treat the file as trustworthy on the computing system despite the security system's treatment of the file as being untrustworthy on the additional computing system.

10. The method of claim 1, wherein determining that the software application used to create the file is a reputable software application comprises:
- identifying a software developer registered with the user community associated with the security system;
- determining that the registered software developer directed the software application to create the file on the computing device;
- determining, based at least in part on the determination that the registered software developer directed the software application to create the file, that the software application used to create the file is reputable.

11. A system for treating locally created files as trustworthy, the system comprising:
- an identification module, stored in memory, that:
  - identifies at least one file created on a computing system protected by a security system that determines whether files encountered by the computing system are trustworthy;
  - identifies a software application used to create the file on the computing system;
- a trustworthiness module, stored in memory, that:
  - determines that the security system has classified the file created on the computing system as untrustworthy;
  - determines that the software application used to create the file on the computing system is a reputable software application used to create trustworthy files within a user community comprising users of computing systems protected by the security system;
  - mitigates false positives associated with the file on the computing system where the file was created by establishing, in response to the determination that the software application used to create the file comprises a reputable software application, a trustworthiness exception that:
    - causes the security system to treat the file as trustworthy on the computing system where the file was created even though the security system has classified the file as untrustworthy;
    - does not cause the security system to treat the file as trustworthy on an additional computing system protected by the security system due at least in part to the file not having been created on the additional computing system;
- at least one processor that executes the identification module and the trustworthiness module.

12. The system of claim 11, wherein the security system comprises at least one of:
- a reputation-based security system that uses reputation information gathered from the user community to determine whether files encountered within the user community are trustworthy;
- a heuristic-based security system that uses at least one heuristic to determine whether files encountered by the computing system are trustworthy.

13. The system of claim 12, wherein the trustworthiness module prevents the reputation-based security system from mistakenly determining that the file comprises malware due to insufficient reputation information associated with the file within the user community.

14. The system of claim 12, wherein the trustworthiness module prevents the heuristic-based security system from mistakenly determining that the file comprises malware based on the security system's use of the heuristic on the file.

15. The system of claim 12, wherein the trustworthiness module:
- analyzes the reputation information gathered from the user community;
- determines, based at least in part on the analysis of the reputation information, that the users within the user community have used the software application to create trustworthy files;
- determines, based at least in part on the determination that the users within the user community have used the software application to create trustworthy files, that the software application is reputable.

16. The system of claim 11, wherein the trustworthiness module:
- applies the trustworthiness exception to the file such that the security system treats the file as trustworthy on the computing system where the file was created despite the file's classification as untrustworthy.

17. The system of claim 11, wherein the trustworthiness module:
- identifies a list of reputable software applications used to create trustworthy files within the user community;
- compares the software application used to create the file on the computing system with the list of reputable software applications;
- determines, based at least in part on the comparison, that the software application used to create the file on the computing system matches at least one of the reputable software applications identified in the list.

18. The system of claim 11, wherein the trustworthiness module:
- identifies the file on at least one additional computing system within the user community;
- classifies the file as untrustworthy on the additional computing system;
- treats the file as untrustworthy on the additional computing system despite the file's trustworthiness exception on the computing system.

19. The system of claim 18, wherein the trustworthiness module maintains the file's trustworthiness exception on the computing system such that the security system continues to treat the file as trustworthy on the computing system despite the security system's treatment of the file as being untrustworthy on the additional computing system.

20. A non-transitory computer-readable-storage medium comprising one or more computer-executable instructions that, when executed by at least one processor of a computing device, cause the computing device to:
- identify at least one file created on a computing system protected by a security system that determines whether files encountered by the computing system are trustworthy;
- determine that the security system has classified the file created on the computing system as untrustworthy;
- identify a software application used to create the file on the computing system;
- determine that the software application used to create the file on the computing system is a reputable software application used to create trustworthy files within a user community comprising users of computing systems protected by the security system;
- mitigate false positives associated with the file on the computing system where the file was created by establishing, in response to the determination, a trustworthiness exception that:
  - causes the security system to treat the file as trustworthy on the computing system where the file was created even though the security system has classified the file as untrustworthy;
  - does not cause the security system to treat the file as trustworthy on an additional computing system protected by the security system due at least in part to the file not having been created on the additional computing system.

* * * * *